(12) United States Patent
Faith et al.

(10) Patent No.: US 7,722,305 B2
(45) Date of Patent: May 25, 2010

(54) PIN WITH SPHERICAL LEAD-IN PORTION

(75) Inventors: Robert Martin Faith, Bellevue, IA (US); Steven Jay Ditzler, Bellevue, IA (US)

(73) Assignee: Deere & Company, Moline, IL (US)

( * ) Notice: Subject to any disclaimer, the term of this patent is extended or adjusted under 35 U.S.C. 154(b) by 800 days.

(21) Appl. No.: 11/375,150

(22) Filed: Mar. 14, 2006

(65) Prior Publication Data

US 2007/0217886 A1    Sep. 20, 2007

(51) Int. Cl.
*F16B 21/18* (2006.01)
(52) U.S. Cl. ............................ 411/351; 403/165
(58) Field of Classification Search .......... 411/351; 403/68, 79, 165
See application file for complete search history.

(56) References Cited

U.S. PATENT DOCUMENTS

| | | | | |
|---|---|---|---|---|
| 2,482,907 A | * | 9/1949 | Hagen | 411/341 |
| 3,155,405 A | * | 11/1964 | Cadovius | 403/13 |
| 3,344,540 A | * | 10/1967 | Ulrich | 37/406 |
| 4,364,698 A | * | 12/1982 | Hardy | 411/351 |
| 4,671,528 A | * | 6/1987 | Thompson | 280/504 |
| 4,861,132 A | * | 8/1989 | Moulin | 385/78 |
| 4,936,004 A | * | 6/1990 | Vaughn | 29/271 |
| 5,046,707 A | * | 9/1991 | Allen | 269/309 |
| 5,395,131 A | * | 3/1995 | Herrick | 280/507 |
| 6,240,660 B1 | * | 6/2001 | Dugas | 37/280 |
| 2003/0223806 A1 | * | 12/2003 | De Freitas | 403/122 |

OTHER PUBLICATIONS

Prior art shown in Fig. 13 of the instant patent application.

* cited by examiner

*Primary Examiner*—Gary Estremsky (57) ABSTRACT

A pin has a shank with a spherical lead-in portion at the free end thereof. The spherical lead-in portion has a diameter that is equal to or slightly less than the diameter of a cylindrical portion of the pin. The purpose of the spherical lead-in portion is to allow a greater portion of the pin to enter a matching hole before further alignment of the centerlines of the pin and the hole is required. This makes aligning the centerlines significantly easier and reduces wear on the structure defining the matching hole. A relief portion following the spherical lead-in portion as well as a chamfer following the relief portion aid in the final alignment.

10 Claims, 8 Drawing Sheets

PIN WITH SPHERICAL LEAD-IN PORTION

FIELD OF THE INVENTION

The invention relates to pins typically used in pivoting mechanisms for off road work vehicles. More specifically, it relates to a method and device for allowing greater variation in the angle of pins as they are assembled into mating holes.

BACKGROUND OF THE INVENTION

Pins have, traditionally, been designed as one-piece cylindrical rods or pins integrated with pin retainers. Conventional pin retainers have attachment areas suitable for attaching the entire pin to a part after the one-piece cylindrical pin has been assembled to a mating hole. Conventional pins include only a chamfer at the free end to ease their entry into the mating holes. Typically, the mating hole, also has a chamfer to ease the entry of the free end of the pin.

SUMMARY OF THE INVENTION

The installation of a conventional pin into a matching bore, bushing or seal without damaging the same is relatively difficult as the mating chamfers merely move the free end of the pin toward the center of the hole; the chamfers do not align the centerlines of the pin and the hole. Thus, as the difference between the diameters of the pin and the hole becomes smaller, the difficulties of assembling the pin into the hole become greater and the angle of entry for the pin must more precisely match the angle of the centerline of the hole. These difficulties arise due to the fact that the lead in length, i.e., the total possible length of the pin entering the hole prior to total alignment of the centerlines is generally no greater than the length of the chamfer. Also, seals and composite bushings may also be damaged when entry of the pin is forced. This leads to unnecessary assembly delays and frustrations.

Described and claimed herein is an invention that significantly reduces the assembly difficulties associated with the conventional pins described above. The invention includes a pin with a spherical diameter at its free end. The spherical diameter, which is sized to be equal to or slightly smaller than the cylindrical diameter of the hole is placed in the hole and advanced in the hole for a lead in length that is significantly greater than that of the conventional pin. This is possible because opposite sides of the spherical diameter are always slightly less than or equal to the cylindrical diameter of the hole. Once the greater lead in length is attained, a chamfer on the pin eases the entry of the pin into the hole because centering the pin in the hole at the chamfer effectively aligns the centerlines of the pin and the hole.

BRIEF DESCRIPTION OF THE DRAWINGS

Embodiments of the invention will be described in detail, with references to the following figures, wherein.

DESCRIPTION OF THE ILLUSTRATED EMBODIMENT

Figure 1:
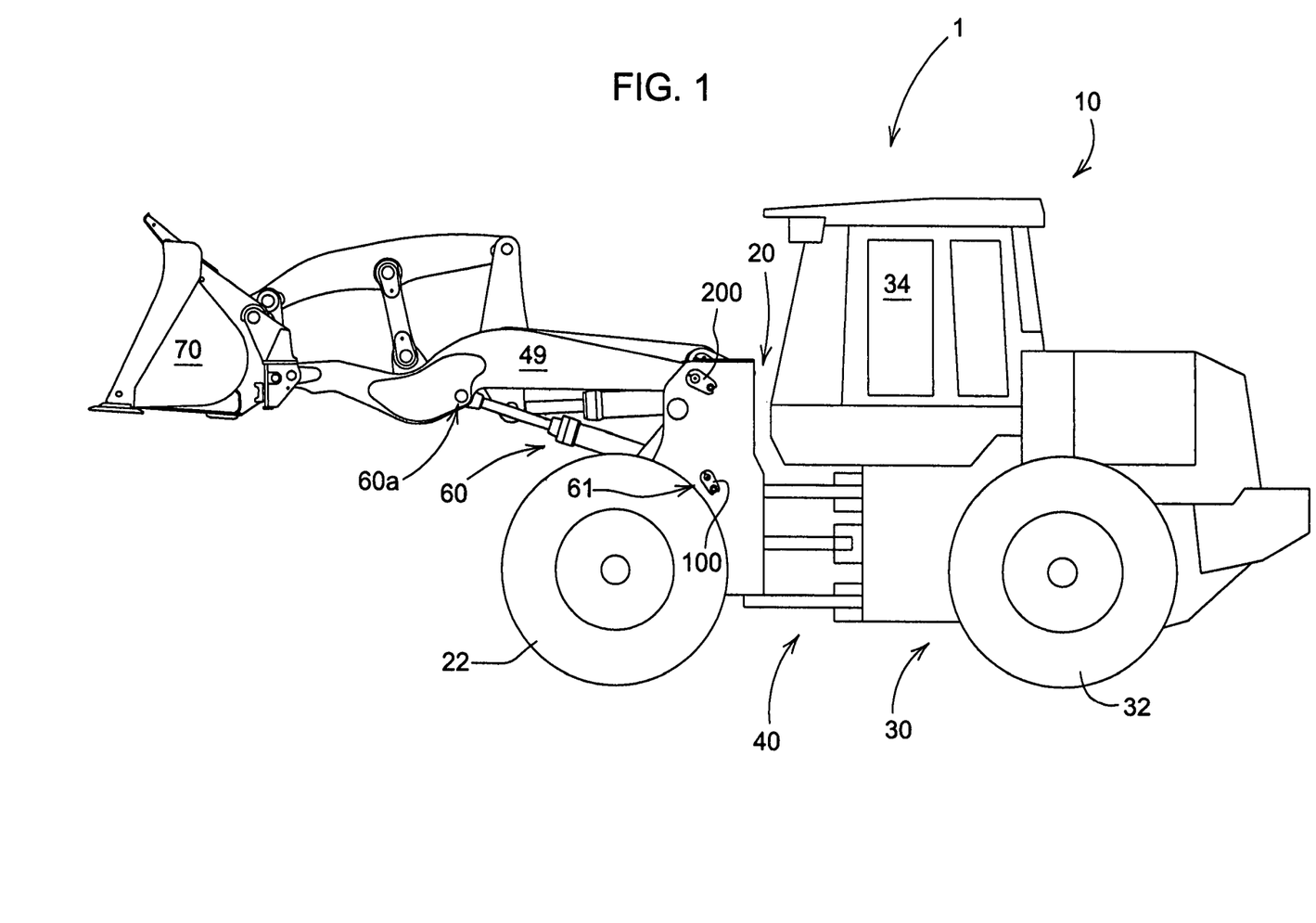
FIG. 1 is a side view of an exemplary embodiment of a vehicle equipped with the invention.

FIG. 1 is a side view of an exemplary embodiment of a work vehicle employing the invention. The particular work vehicle illustrated in FIG. 1 is a loader 1 and it includes a frame 10 which includes a cab 34, a front frame portion 20, a rear frame portion 30, front wheels 22, rear wheels 32, a work tool 70, a boom 49 and a hydraulic cylinder 60 pivotally connected to the front frame portion 20 at pivot point 61 and pivotally connected to the boom at pivot point 60a. The front and rear wheels 22 and 32 propel the work vehicle 1 along the ground in a manner well known in the art.

Pin units 100 and 200 (e.g., flagged pin units) are exemplary embodiments of the invention. While pins 100 and 200 are both exemplary embodiments of the invention, only pin 100 will be addressed hereafter as it is identical to pin 200 and additional wording addressing pin 200 would be redundant.

Figure 2:
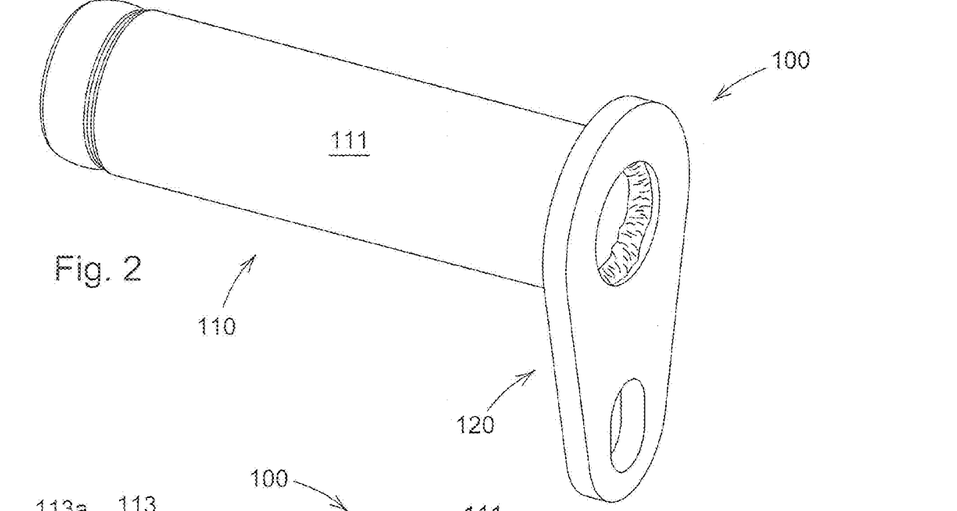
FIG. 2 is an oblique view of an exemplary embodiment of the invention.
Figures 3, 4:
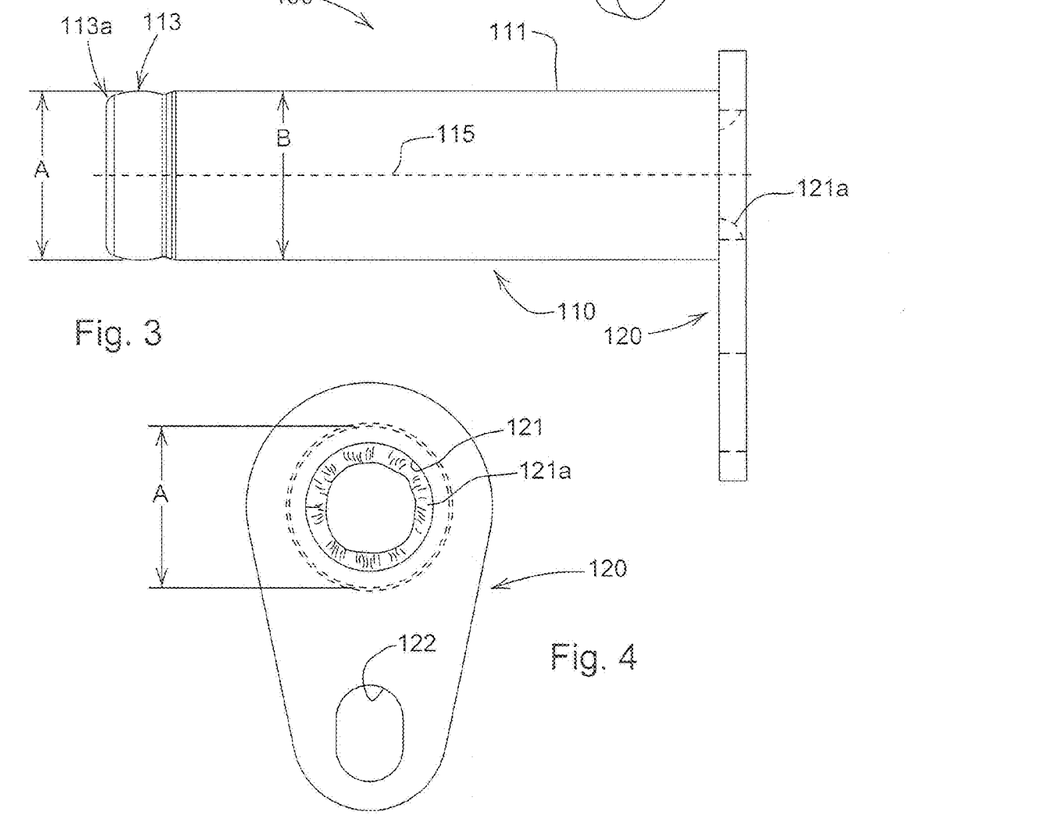
FIG. 3 is a side view of the pin of FIG. 2.
FIG. 4 is an end view of the pin of FIG. 2.

FIG. 2 is an oblique view of an exemplary embodiment of the invention illustrated as pin 100 in FIG. 1 while FIGS. 3 and 4 are side and rear end views of the pin 100 illustrated in FIG. 1. As illustrated in FIGS. 2-4, the pin 100 includes a shank, 110, as shown in FIG. 5, and a pin retainer 120, as shown in FIG. 6.

Figure 5:
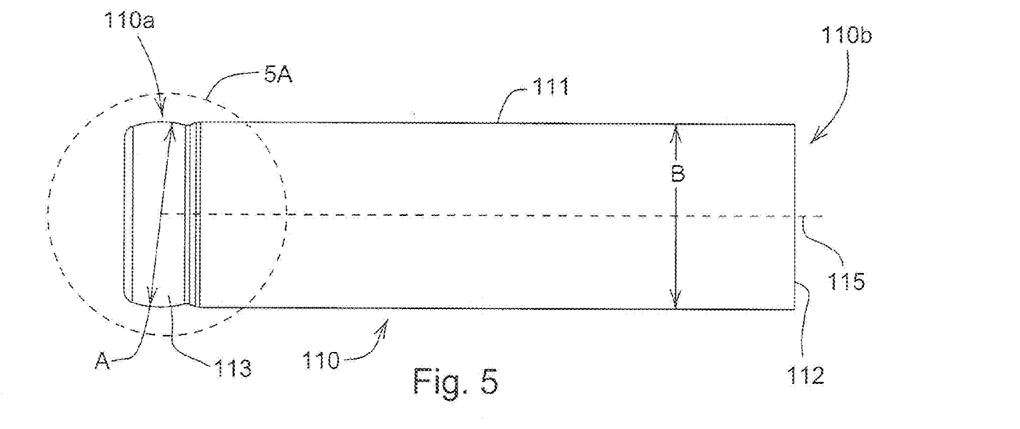
FIG. 5 is a detailed illustration of the pin shown in FIG. 2.
Figure 5A:
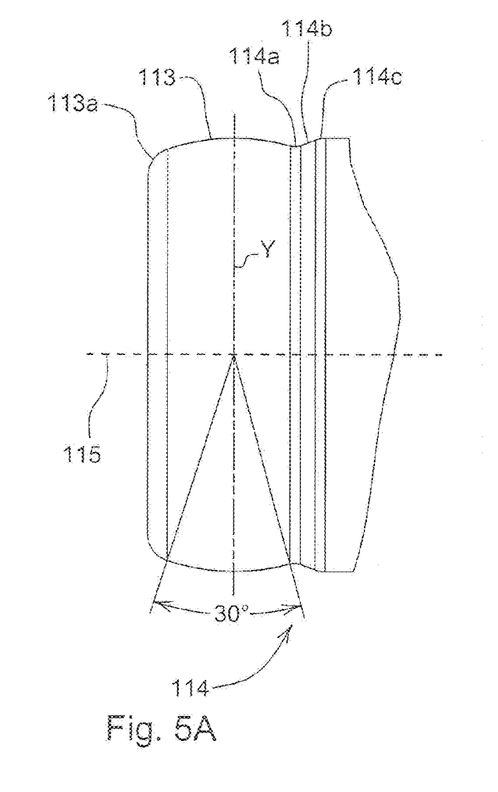
FIG. 5A is an enlarged view of the encircled area designated 5A on FIG. 5.

As illustrated in FIG. 5, and the enlarged view FIG. 5A, the shank has a first end 110a and a second end 110b. The shank 110 includes a cylindrical portion 111 having a cylindrical surface and a spherical lead-in portion 113, having a spherical surface which is symmetrical about a plane Y extending perpendicular to an axis 115 of the shank 110 and has diametrically opposite circular profiles which each extend through an angle of approximately 30° about a center of the spherical lead-in portion 113. The first end 110a includes a first bullnose or chamfer 113a, the spherical lead-in portion 113, and a transition area 114 between the spherical lead-in portion 113 and the cylindrical portion 111. As illustrated, the transition area 114 includes a first annular relief area 114a joined to, and extending rightwardly from the spherical lead-in portion 113, a second annular relief area 114c joined to, and projecting leftwardly from the cylindrical portion 111 and a second chamfer 114b extending between and joining the first and second relief areas 114a and 114c. The transition area 114 thus cooperates with the right half of the lead-in portion 113 to define an annular groove having the annular relief area 114a at its bottom. The remainder of the shank is the cylindrical portion 111, leaving a flat circular surface 112 at the second end 110b that is orthogonal to an axis 115 of the cylindrical portion 111. As a general rule, the spherical diameter A of the spherical lead-in portion 113 is slightly less than the cylindrical diameter B of the cylindrical portion 111. However, under some circumstances the spherical diameter A may be equal to or greater than the cylindrical diameter B.

Figure 6:
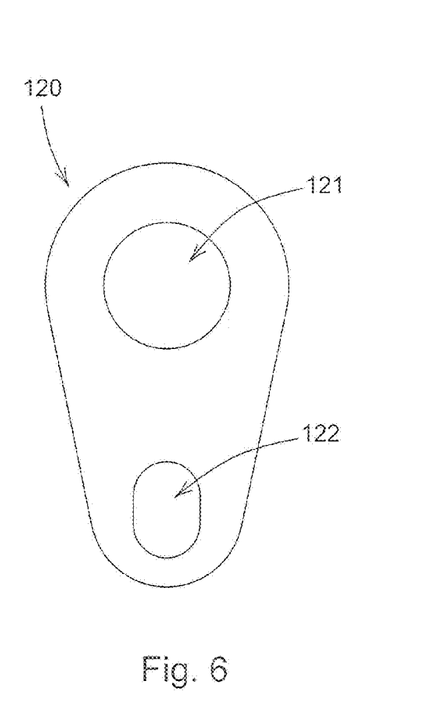
FIG. 6 is a detailed illustration of the pin retainer shown in FIG. 2.

As illustrated in FIGS. 2, 4 and 6, the pin retainer 120 contains a circular hole 121 and a slotted hole 122. As illustrated in FIGS. 3 and 4 the diameter of the circular hole 121 is smaller than the cylindrical diameter B of the shank. In this particular embodiment the second end 110b of the shank is attached to the pin retainer 120 via a weldment 121a between the second end 110b and the material along the surface of the circular hole 121.

Figure 7:
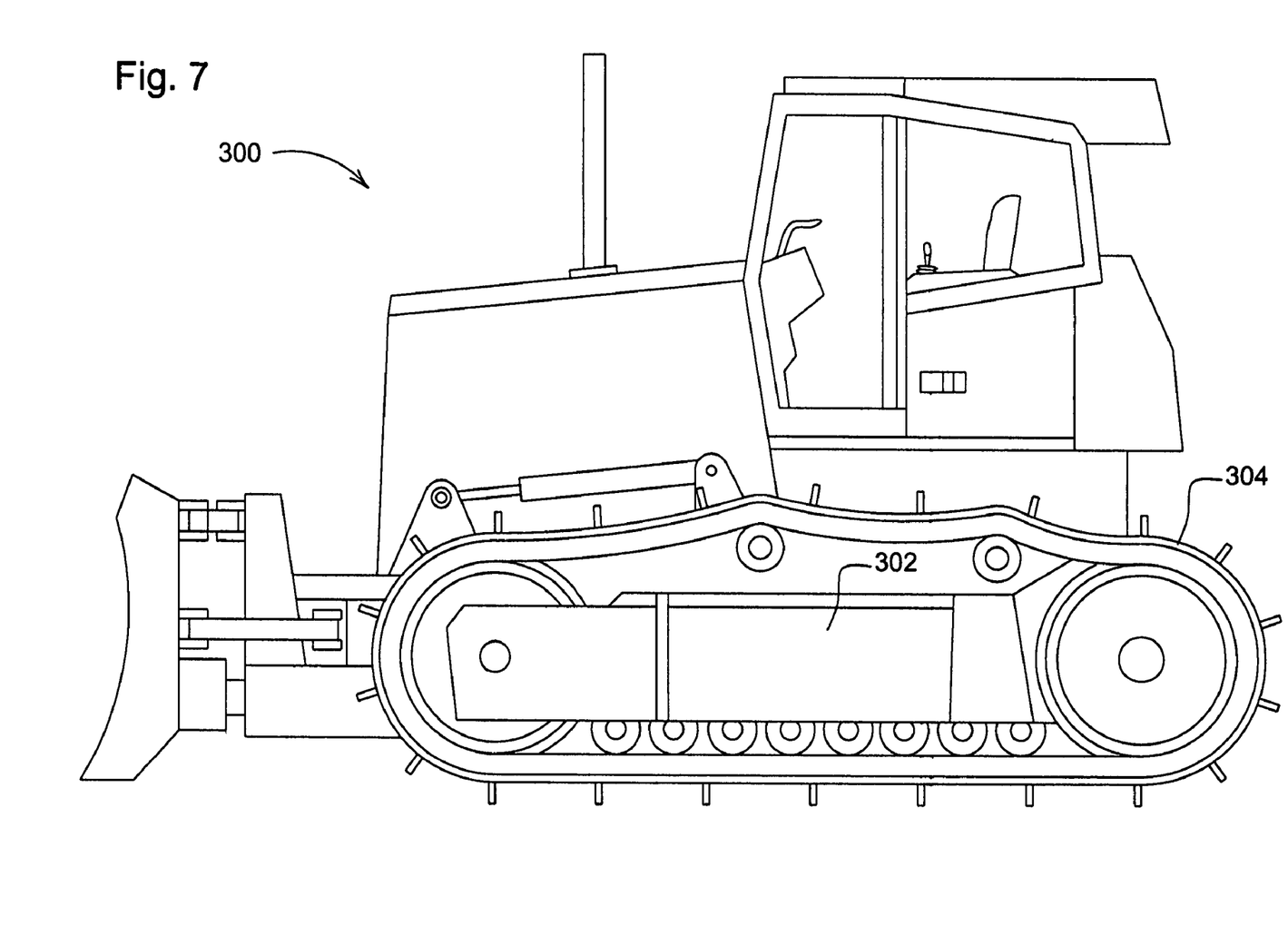
FIG. 7 is a side elevation view of a crawler equipped with the invention.
Figure 8:
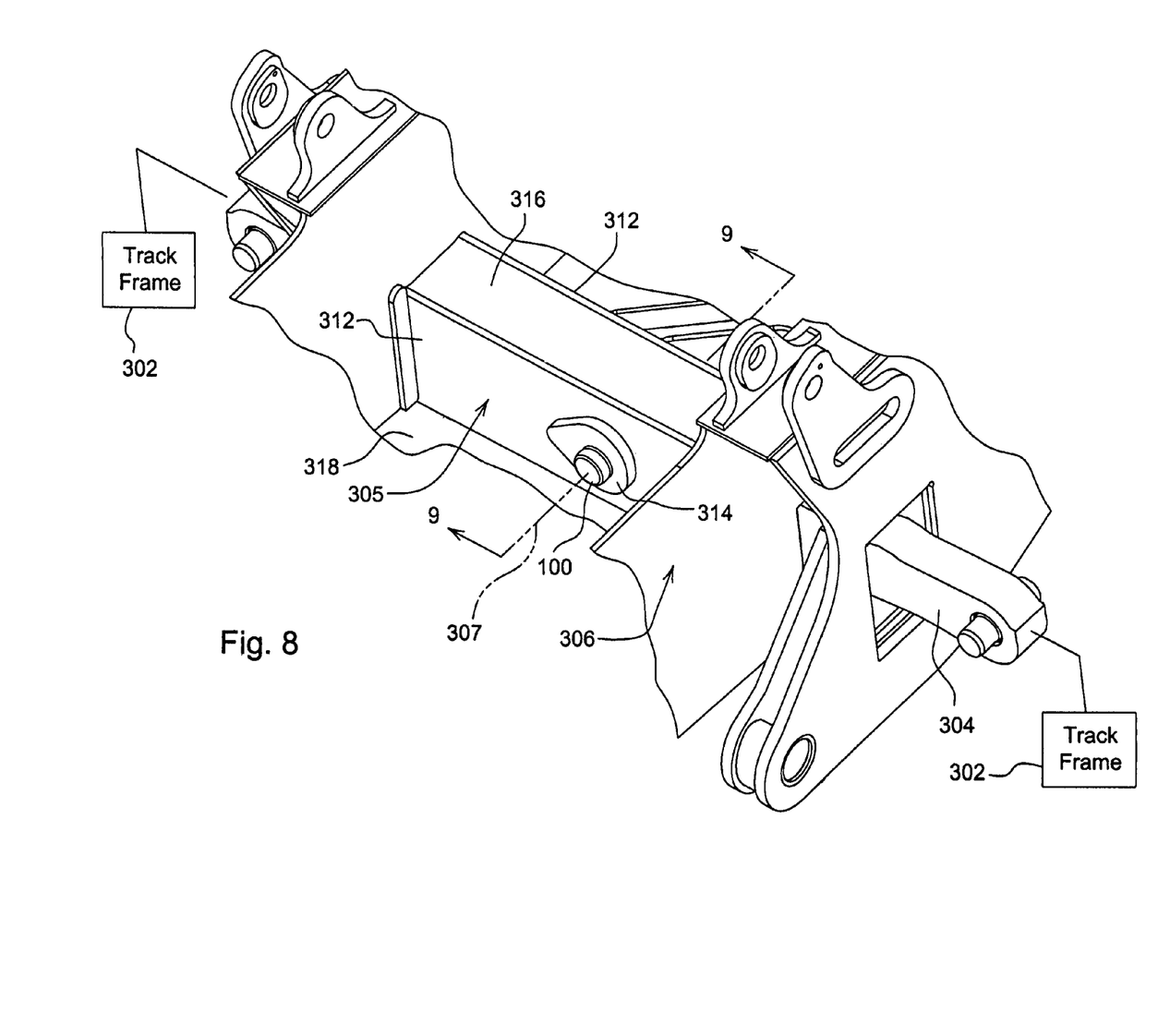
FIG. 8 is an oblique view showing the pin used to attach a cross bar to a main frame of the crawler of FIG. 7.

Referring to FIGS. 7 and 8, the shank may be used in a variety of other work vehicles including, but not limited to, a crawler 300. The crawler 300 has a track frame 302 (FIG. 7) on opposite sides thereof to support a track assembly 304. Each track frame 302 is secured to an end of a cross bar 304 (FIG. 8) extending through a box 305 of a main frame 306 of the crawler 300. The cross bar 304 is mounted to pivot about a pivot axis 307 defined by the pin 100 to allow vertical movement of the track frames 302 relative to the main frame 306.

Figure 9:
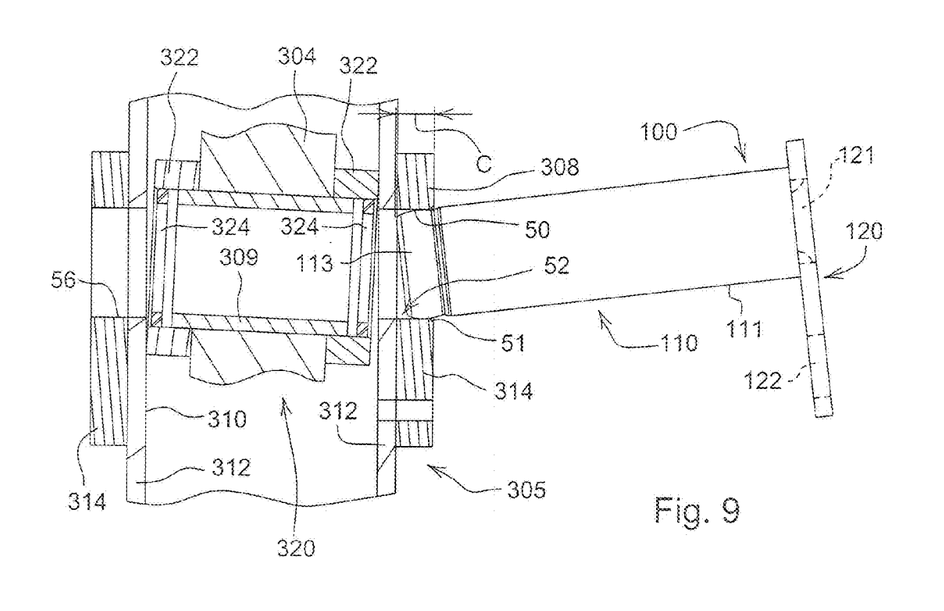
FIG. 9 is a sectional view taken along lines 9-9 of FIG. 8 showing a first portion of the assembly process.

Referring to FIG. 9, the box 305 illustratively includes a number of components to define an internal bar-receiving space 310 through which the cross bar 304 and components associated therewith extend. Exemplarily, the box 305 includes side walls 312, a doubler 314 welded to an outer surface of each side wall 312, and top and bottom walls 316, 318 (FIG. 8) to which the side walls 312 are welded.

A cross bar assembly 320 includes the cross bar 304, a bushing 309 received in a bore provided in the cross bar 304, two doublers 322 welded to an outer surface of the bushing 309 at opposite ends thereof, and a seal 324 welded to an inner surface of each doubler 322 outboard of the bushing 309 to minimize ingress of debris into the bushing 309. There is a slight clearance between the doublers 322 and the inside surfaces of the side walls 312, allowing the cross bar assembly 320 to be inserted into the internal bar-receiving space 310 for eventual reception of the pin 100 through the bushing 309 to mount the assembly 320 for pivotal movement about the axis 307. As such, initially (i.e., before insertion of the pin 100), the cross bar assembly may be somewhat canted within the space 310, as illustrated in FIG. 9.

Figure 10:
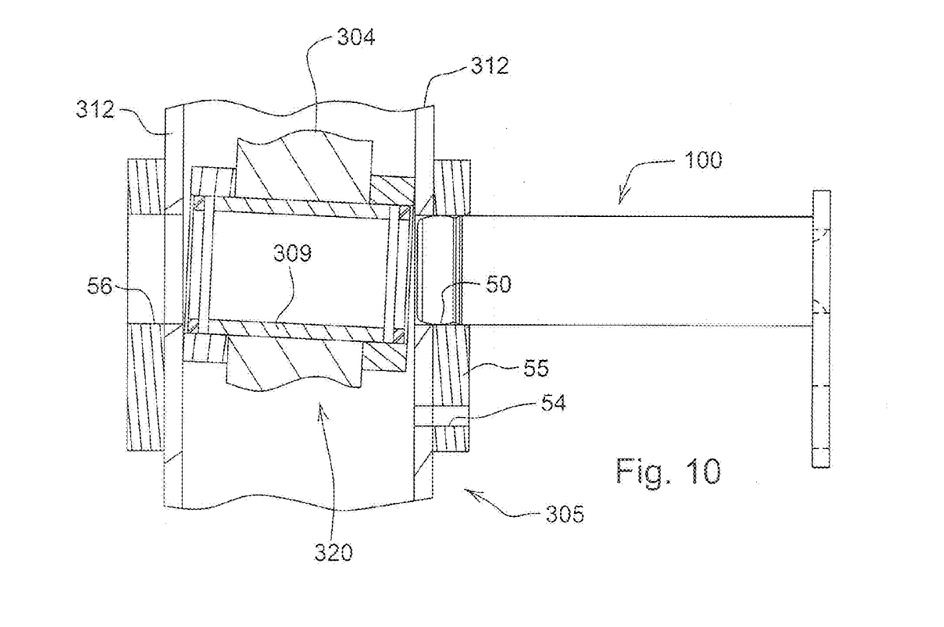
FIG. 10 is a sectional view showing a second portion of the assembly process.

In practice, the first end 110a of the pin 100 is partially aligned with a matching, shank-receiving hole 50 by partially aligning a hole chamfer 51 and the first bullnose or chamfer 113a as illustrated in FIG. 9 for example. The spherical lead-in portion 113 may then be advanced further into the matching hole 50 at any suitable pin angle until the movement is stopped by either the transition area 114 or the cylindrical portion 111 as illustrated in FIG. 9. At this point in the assembly, the angle of the shank 110 is easily adjusted to allow the remainder of the shank 110 to slide into the matching hole as illustrated in FIG. 10.

Figure 11:
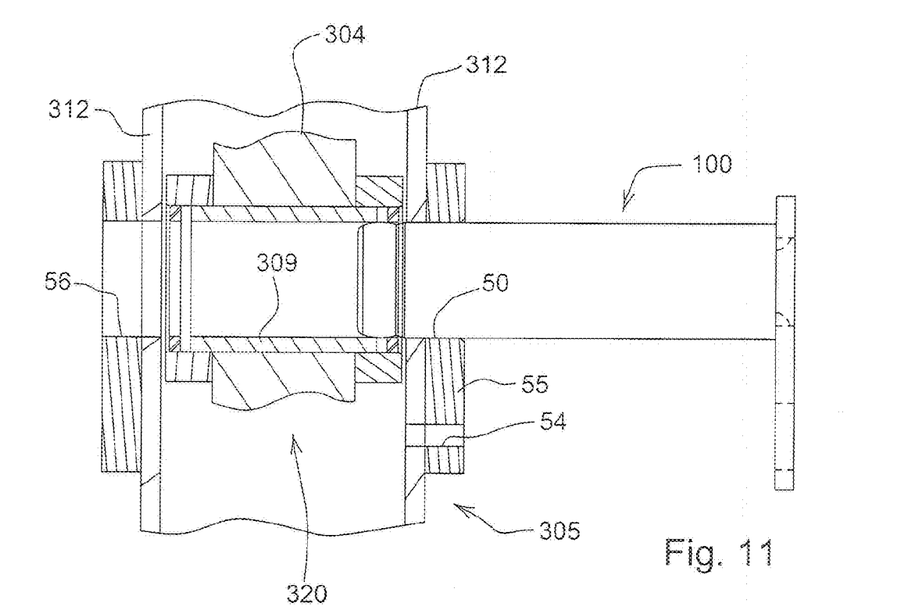
FIG. 11 is a sectional view showing a third portion of the assembly process.

Upon further insertion of the shank 110, the spherical lead-in portion 113 comes into engagement with one of the seals 324 and an end of the bushing 309. The spherical curvature of the outer surface of the spherical lead-in portion 113 urges the cross bar assembly 320 smoothly toward an upright position as the outer surface of the spherical lead-in portion 113 slides against the bushing end, as illustrated in FIG. 11.

The shank 110 then passes through a matching hole 56 formed in the opposite side wall 312 and doubler 314. The spherical curvature of the outer surface of the spherical lead-in portion 113 assists with passage of the shank 110 through that hole 56. In this way, the cross bar assembly 320 becomes aligned with the matching holes 50 and 56 and assumes its upright position illustrated in FIG. 12.

Figure 12:
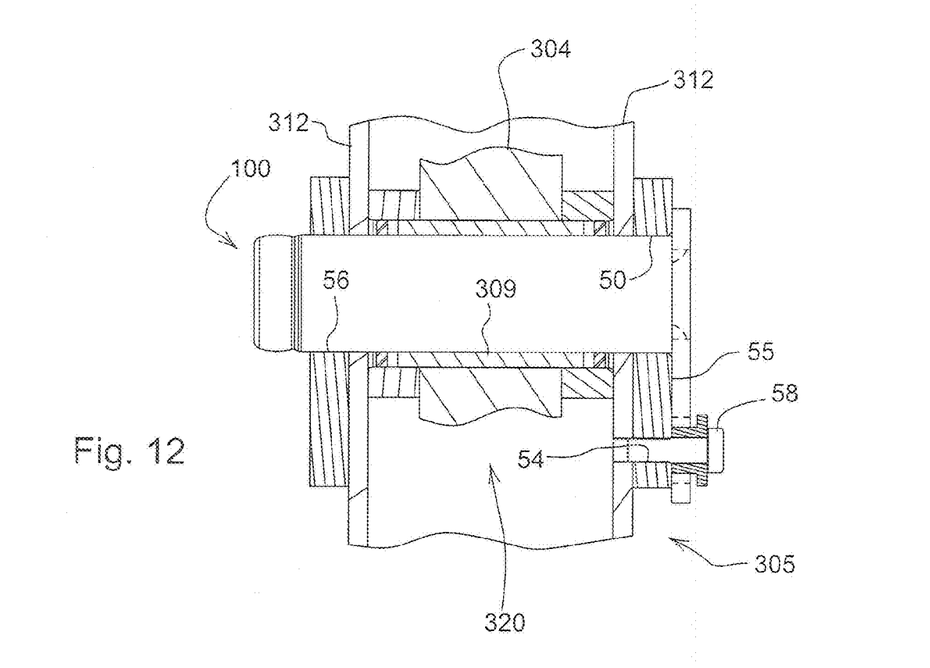
FIG. 12 is a sectional view showing the pin assembled in a cylindrical hole.

Once the shank 110 is completely assembled in the matching holes 50, 56, the pin retainer 120 is rotated until the slotted hole 122 aligns with a tapped anchoring hole 54 extending inwardly from an outer surface 55 of the doubler 314. A screw 58 is then used to anchor the pin retainer 120 flat against the matching surface 55 and restrict lateral movement of the shank 110 within the matching holes 50, 56. In this way, the shank 110 is secured in a cylindrical hole defined by the side walls 312, the doublers 314, the bushing 309, and the seals 324.

Figure 13:
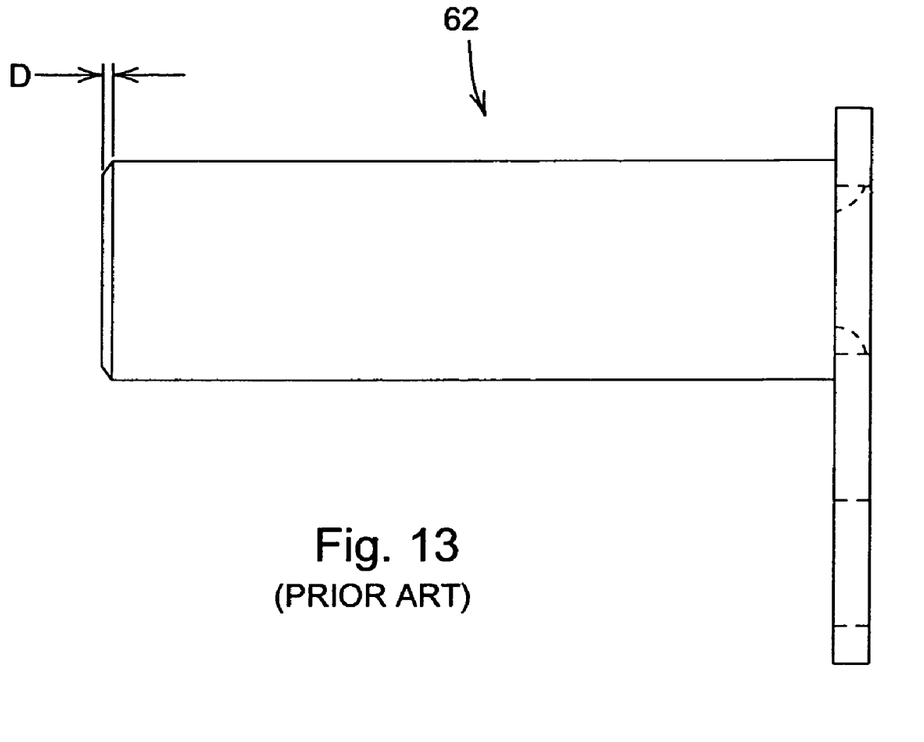
FIG. 13 is a view of a prior art flagged pin assembly

Greater entry length for the pin at greater ease is made possible by the fact that the spherical diameter A is slightly less than or equal to the cylindrical diameter B at any angle of entry in which it is possible for opposite sides of the spherical lead-in portion 113 to interface with a surface 52 of the matching cylindrical hole 50. Ease of adjusting the angle for the completion of the assembly process is facilitated by the uniform diameter of the spherical lead-in portion 113 and the fact that the transition area 114 cooperates with the lead-in portion 113 to define an annular groove having the first relief area 114a at the bottom of the groove such that the relief area smoothes the transition between the spherical lead-in portion 113 and the second chamfer 114b. Thus, the angle of entry is almost automatically adjusted when the assembler applies pressure to the shank 110 to further advance the shank into the matching hole 50 as the transition area is shaped to force an appropriate change in the entry angle when the shank advances into the matching hole 50. Further, alignment of the centerlines of the shank and the matching hole is accomplished with greater rapidity and ease than with the conventional assemblies illustrated in FIG. 13 as the invention entry length C of FIG. 9 is greater than a conventional entry length D illustrated in FIG. 13.

Use of the spherical lead-in portion 113 may reduce wear on the engagement end of the bushing 309 that may otherwise result from engagement between the shank and the engagement end. This wear-reducing property may be particularly useful when the bushing 309 is made of a composite material, but can also be useful when the bushing 309 is made of other suitable materials such as steel. In the case of a composite bushing, the material includes a reinforcing agent and a polymer matrix. The reinforcing agent may include E-glass fibers, although other reinforcements such as S-glass, carbon, KEVLAR®, metal, high modulus organic fibers (e.g., aromatic polyamides, polybenzamidazoles, and aromatic polyimides), and other organic fibers (e.g., polyethylene and nylon) may be used. Blends and hybrids of the various reinforcing materials may be used. Other suitable composte materials may be used including whiskers and fibers such as boron, aluminum silicate, and basalt.

The polymer matrix may include a thermoplastic resin or a thermosetting resin. In the case of a thermoplastic resin, the matrix may be polytetrafluoroethylene (TEFLON®) or other thermoplastic fluoropolymer. Thermosetting resins which may be useful include, but are not limited to, unsaturated polyesters, vinyl esters, polyurethanes, epoxies, phenolics, and mixtures and blends thereof.

Exemplarily, the composte bushing 309 is made of a fiber-reinforced polymer. In particular, it is exemplarily made of polytetrafluoroethylene reinforced by glass fibers. The construction of the shank is useful to minimize wear on the end of the composite bushing 309 during assembly.

Having described the illustrated embodiment, it will become apparent that various modifications can be made without departing from the scope of the invention as defined in the accompanying claims.

The invention claimed is:

1. A pin, comprising:
   a shank including a first end defined by a spherical lead-in portion having a spherical surface, a transition portion joined directly to said spherical surface of said lead-in portion, and a cylindrical portion having a cylindrical surface joined directly to said transition portion;

the spherical lead-in portion being symmetrical about a plane extending perpendicular to a central axis of said cylindrical portion and having diametrically opposite circular profiles which each extend through an angle of approximately 30° about a center of said spherical lead-in portion, with said spherical lead-in portion having a diameter approximately equal to a diameter of said cylindrical portion and being adapted to be received by a cylindrical hole to facilitate entry of the shank therein; and said transition portion including an annular relief portion joined directly to said spherical surface of said spherical lead-in portion, the transition portion cooperating with said spherical surface to form an annular groove between said spherical lead-in portion and said cylindrical surface of said cylindrical portion, with said annular groove including a bottom defined by said annular relief area and including a side defined at least in part by a chamfer defining a second lead-in portion, the relief area being joined to the second lead-in portion thereby providing a direct transition from the spherical lead-in portion to the second lead-in portion.

2. The pin of claim 1, further comprising a pin retainer secured to, and projecting from a second end of the shank at a right angle to said central axis such that the pin is configured as a flagged pin.

3. The pin of claim 2, wherein the shank comprises a cylindrical portion welded to the pin retainer.

4. The pin of claim 3, wherein the pin retainer comprises a welding surface for welding the pin retainer to the shank and an attachment area for attaching the pin retainer to a mating part.

5. The pin of claim 1, wherein the shank and the pin retainer are formed as one piece with one another.

6. The pin of claim 1, in combination with a bushing at least partially defining the cylindrical hole and receiving the shank in the cylindrical hole.

7. The pin of claim 6, wherein the bushing is made of a fiber-reinforced polymer.

8. The pin of claim 7, wherein the pin is included in a crawler comprising a main frame, two track frames, and a cross bar, the two track frames being secured to opposite ends of the cross bar, the bushing being received in the cross bar, and the pin extending through the bushing and the cross bar and attaching the cross bar to the main frame for pivotal movement of the cross bar about the pin for corresponding movement of the track frames relative to the main frame.

9. The pin of claim 1, wherein the diameter of said spherical lead-in portion is less than the diameter of said cylindrical portion.

10. The pin of claim 1, wherein the diameter of said spherical lead-in portion is greater than the diameter of said cylindrical portion.

* * * * *